(12) United States Patent
Polak et al.

(10) Patent No.: US 11,681,878 B2
(45) Date of Patent: Jun. 20, 2023

(54) METHODS AND APPARATUS FOR CREATING DOMAIN-SPECIFIC INTENDED-MEANING NATURAL LANGUAGE PROCESSING PIPELINES

(71) Applicant: Ernst & Young U.S. LLP, New York, NY (US)

(72) Inventors: Adam Polak, Riverside, CT (US); Ryan David Gleeson, Los Angeles, CA (US)

(73) Assignee: Ernst & Young U.S. LLP, New York, NY (US)

( * ) Notice: Subject to any disclaimer, the term of this patent is extended or adjusted under 35 U.S.C. 154(b) by 0 days.

(21) Appl. No.: 17/982,760

(22) Filed: Nov. 8, 2022

(65) Prior Publication Data

US 2023/0161965 A1    May 25, 2023

Related U.S. Application Data

(60) Provisional application No. 63/281,755, filed on Nov. 22, 2021.

(51) Int. Cl.
  *G06F 17/00* (2019.01)
  *G06F 40/30* (2020.01)
(52) U.S. Cl.
  CPC .................... *G06F 40/30* (2020.01)
(58) Field of Classification Search
  None
  See application file for complete search history.

(56) References Cited

U.S. PATENT DOCUMENTS

| | | | | |
|---|---|---|---|---|
| 7,546,235 | B2 * | 6/2009 | Brockett | G06F 40/30 704/4 |
| 10,303,769 | B2 * | 5/2019 | Zorzin | G06F 40/232 |
| 10,755,804 | B2 * | 8/2020 | Katwala | G06F 40/169 |
| 11,068,662 | B2 * | 7/2021 | Zorzin | G06F 40/232 |
| 2015/0073777 | A1 * | 3/2015 | Assam | G06F 40/30 704/9 |
| 2017/0046425 | A1 * | 2/2017 | Tonkin | G06F 40/30 |

(Continued)

OTHER PUBLICATIONS

Ananthu, Mukund, "Sentence Similarity Direction using Ensembling," IARJSET, Aug. 1, 2017, vol. 4, Issue 8, 3 pages.

(Continued)

*Primary Examiner* — Satwant K Singh
(74) *Attorney, Agent, or Firm* — Cooley LLP

(57) ABSTRACT

A method includes receiving a dataset that includes a plurality of input texts. Each input text from the plurality of texts is associated with a content category from a plurality of content categories based on a comparison between that input text and an intended meaning that is common for each comparison. For each model in a plurality of models, and for each content category from the plurality of content categories, that model is executed on each input text from the plurality of input texts to generate an average similarity/dissimilarity score for that content category. At least one model from the plurality of models is selected, based on the average similarity score for each content category from the plurality of content categories for each model in the plurality of models, to determine whether an input text is similar/dissimilar to the intended meaning.

20 Claims, 12 Drawing Sheets

(56) References Cited

U.S. PATENT DOCUMENTS

2021/0019357 A1\* 1/2021 Bennett .................. G06F 40/20

OTHER PUBLICATIONS

Chandrasekaran, Dhivya et al., "Evolution of Semantic Similarity—A Survey," ARXIV.ORG, Cornell University, Jan. 30, 2021, vol. 1, No. 1, pp. 1-35.
Hassan, Basma et al., "UESTS: An Unsupervised Ensemble Semantic Textual Similarity Method," IEEE Access, Jul. 15, 2019, vol. 7, pp. 85462-85482.
International Search Report and Written Opinion in PCT/US2022/079806, dated Mar. 20, 2023, 18 pages.
Reimers, Nils et al., "Sentence-BERT: Sentence Embeddings using Siamese BERT-Networks," arXiv preprint arXiv:1908.10084, Aug. 27, 2019, 11 pages.
Srinarasi, Shruthi et al., "A Combination of Enhanced WordNet and BERT for Semantic Textual Similarity," 10th International Conference on Digital Interactive Arts, ACMPUB27, Aug. 20, 2021, pp. 191-198.

\* cited by examiner

| | |
|---|---|
| 5 | The two sentences are completely equivalent, as they mean the same thing. The bird is bathing in the sink. Birdie is washing itself in the water basin. |
| 4 | The two sentences are mostly equivalent, but some unimportant details differ. Two boys on a couch are playing video games. Two boys are playing a video game. |
| 3 | The two sentences are roughly equivalent, but some important information differs/missing. John said he is considered a witness but not a suspect. "He is not a suspect anymore," John said. |
| 2 | The two sentences are not equivalent, but share some details. They flew out of the nest in groups. They flew into the nest together. |
| 1 | The two sentences are not equivalent, but are on the same topic. The woman is playing the violin. The young lady enjoys listening to the guitar. |
| 0 | The two sentences are completely dissimilar. The black dog is running through the snow. A race car driver is driving his car through the mud. |

| Base Sentence | Themes | "Your team submitted the project late" |
|---|---|---|
| Word for Word | Synonyms | "Your group delivered the assignment late" |
| Sentence for Sentence | Rearranging Synonyms | "The project was delivered late" |
|  | Implied Definition | "The project was not submitted on time by your team" |
| Missing Important Context (changes meaning) | Question vs. Statement | "Did your team submit the project late?" |
|  | Keyword Missing | "Your team submitted the project" |
| Missing Important Context (specific) | Keyword Missing | "The project was submitted late" |
|  | Pronouns | "My team submitted the project late" |
| Key Information is Wrong (noun) | Random Words | "Your team submitted the picnic late" |
| Key Information is Wrong (verb) | Random Words | "Your team supported the project late" |
| Superfluous Information (irrelevant) | and (SI) | "Your team submitted the project late and I ate a pie" |
|  | Mixed in | "Your team you know submitted what the project late" |
| Superfluous Information (relevant) | Revealed Idea | "Your team missed the deadline for turning the project in time and submitted the project late" |
|  | Expanding on Idea | "Your team submitted the project late causing a backlog in workflow" |
| Negating Information | Not | "Your team did not submit the project late" |
|  | Opposite Meaning | "Your team submitted the project early" |
| Initial Remark (Matching Sentiment) | Matching Sentiment | "Unfortunately your team submitted the project late" |
| Initial Remark (Opposite Sentiment) | Opposite Sentiment | "That is fantastic your team submitted the project late" |
| Initial Remark (neutral) | Understanding | "Okay I understand your team submitted the project late" |
|  | Neutral Sentiment | "That is how your team submitted the project late" |

| Base Sentence | "Your team submitted the project late" | Prevalence | Priority |
|---|---|---|---|
| Sentence for Sentence | "The project was not submitted on time by your team" | 33.6% | HIGH |
| Superfluous Information (relevant) | "Your team missed the deadline for turning the project in on time and submitted the project late" | 18.1% | HIGH |
| Superfluous Information (irrelevant) | "Your team submitted the project late and I ate a pie" | 12.8% | HIGH |
| Word for Word | "Your group delivered the assignment late" | 7.5% | HIGH |
| Initial Remark (neutral) | "Okay I understand your team submitted the project late" | 7.2% | HIGH |
| Missing Important Context (changes meaning) | "Your team submitted the project" | 26.8% | MEDIUM |
| Missing Important Context (specificity) | "The project was submitted late" | 25.7% | MEDIUM |
| Key Information Wrong (noun) | "Your team submitted the picnic late" | 15.8% | MEDIUM |
| Key Information Wrong (verb) | "Your team supported the project late" | 10.9% | MEDIUM |

| Categories | Examples |
|---|---|
| Remarks | "I completely understand, this new work environment has been challenging for all of us" |
| Implied (C) | "So double triple checking this work and making sure…" |
| Expanding | "So what makes you feel that you're not doing well and what do you think you can do better?" |
| Emphasis | "Thank you so much for coming to me and sharing that you're ready for a promotion" |
| Filler Words | "So promotion to manager, you know, requires a lot more than just, you know, good work" |
| False Starts | "…and the client has been happy and that you based on that you deserve…" |
| Indirect (preheating) | "I think one of the first things that we have to take into consideration from a promotion standpoint is…" |
| Explaining | "Yeah but this is your job, trying to figure this out, you need to do it" |
| Rewording | "I understand you are ready or feel like you are ready for promotion" |
| Bad Ending | "That work should be done in time and not go over budget and you just need to pay attention to that yeah" |

1000

Receive a dataset that includes a plurality of input texts, each input text from the plurality of input texts associated with a content category from a plurality of content categories based on a comparison between that input text and an intended meaning that is common for each comparison 1001

→

For each model in a plurality of models, run that model on each input text from the plurality of input texts to generate an average similarity / dissimilarity score for each content category from the plurality of content categories 1002

→

Select, based on the average similarity / dissimilarity score for each content category from the plurality of content categories for each model in the plurality of models, at least one model from the plurality of models to determine whether an input text is similar/ dissimilar to the intended meaning 1003

→

Generate at least one content category-specific natural language processing pipeline associated with at least one content category included in the plurality of content categories, the average similarity/dissimilarity score for the at least one content category being outside an acceptable range 1004

FIG. 10

Receive a dataset that includes (1) a first set of input texts associated with a first content category based on a first comparison between each input text from the first set of input texts and an intended meaning that is common for each comparison, and (2) a second set of input texts associated with a second content category different than the first content category based on a second comparison between each input text from the second set of input texts and the intended meaning that is common for each comparison 1101

Run a first model on the first set of input texts to generate a first similarity / dissimilarity score that is associated with the first content category 1102

Run the first model on the second set of input texts to generate a second similarity / dissimilarity score that is associated with the second content category 1103

Run a second model on the first set of input texts to generate a third similarity / dissimilarity score that is associated with the first content category 1104

Run the second model on the second set of input texts to generate a fourth similarity / dissimilarity score that is associated with the second content category 1105

Receive a request to determine similarity / dissimilarity of an input text to the intended meaning 1106

Select the first model and not the second model for usage with the request based on the first similarity / dissimilarity score, the second similarity / dissimilarity score, the third similarity / dissimilarity score, and the fourth similarity / dissimilarity score 1107

Cause similarity / dissimilarity of the input text to the intended meaning to be determined using the first model and not the second model 1108

Receive a dataset that includes a plurality of input texts, each input text from the plurality of input texts associated with a content category from a plurality of content categories based on a comparison between that input text and an intended meaning that is common for each comparison 1201

For each model in a plurality of models, run that model on each input text from the plurality of input texts to generate an average similarity / dissimilarity score for each content category from the plurality of content categories 1202

Select, based on the average similarity / dissimilarity score for each content category from the plurality of content categories for each model in the plurality of models, at least one model from the plurality of models to determine whether an input text is similar/ dissimilar to the intended meaning 1203

Cause similarity / dissimilarity of the input text to the intended meaning to be determined using the at least one model and not remaining models from the plurality of models 1204

METHODS AND APPARATUS FOR CREATING DOMAIN-SPECIFIC INTENDED-MEANING NATURAL LANGUAGE PROCESSING PIPELINES

CROSS-REFERENCE TO RELATED APPLICATIONS

This application claims priority to and benefit of U.S. Provisional Application No. 63/281,755, titled "METHODS AND APPARATUS FOR CREATING DOMAIN-SPECIFIC INTENDED-MEANING NATURAL LANGUAGE PROCESSING PIPELINES," filed Nov. 22, 2021, the entire disclosure of which is incorporated herein by reference in its entirety.

FIELD

In one or more embodiments, domain-specific intended-meaning natural language processing pipelines are generated. Language is processed to determine if and to what extent the language contains an intended meaning.

BACKGROUND

A need exists to be able to compare similarity in meaning between texts to determine if a text contains an intended meaning. For instance, an artificial intelligence (AI) system in a customer service setting may be asked a question with a single intended meaning, but in various, unique forms. Although one user may ask the AI system "What happened to my delivery?", while another user asks the AI system "What is wrong with my shipping?", the AI system should be able to provide the same response because both questions have essentially the same intended meaning. Embedding and comparison algorithms exist for analyzing similarity between texts, but suffer from drawbacks such as sub-par accuracy and low customizability for specific applications.

BRIEF DESCRIPTION OF THE DRAWINGS

FIG. 1 shows an example of input text pre-grouped according to a predefined similarity scale.

FIG. 2 shows an example of input text grouped by content category, according to an embodiment.

FIG. 3 shows an example of input text grouped by content category, according to an embodiment.

FIG. 4 shows an example of input text grouped by style category, according to an embodiment.

FIG. 10 shows a flowchart of a method to determine similarly/dissimilarly between an input text and an intended meaning, according to an embodiment.

FIG. 11 shows a flowchart of a method to select a model to determine a similarity/dissimilarity of an input text to an intended meaning, according to an embodiment.

FIG. 12 shows a flowchart of a method to determine similarly/dissimilarly between an input text and an intended meaning, according to an embodiment.

SUMMARY

Figure 5:
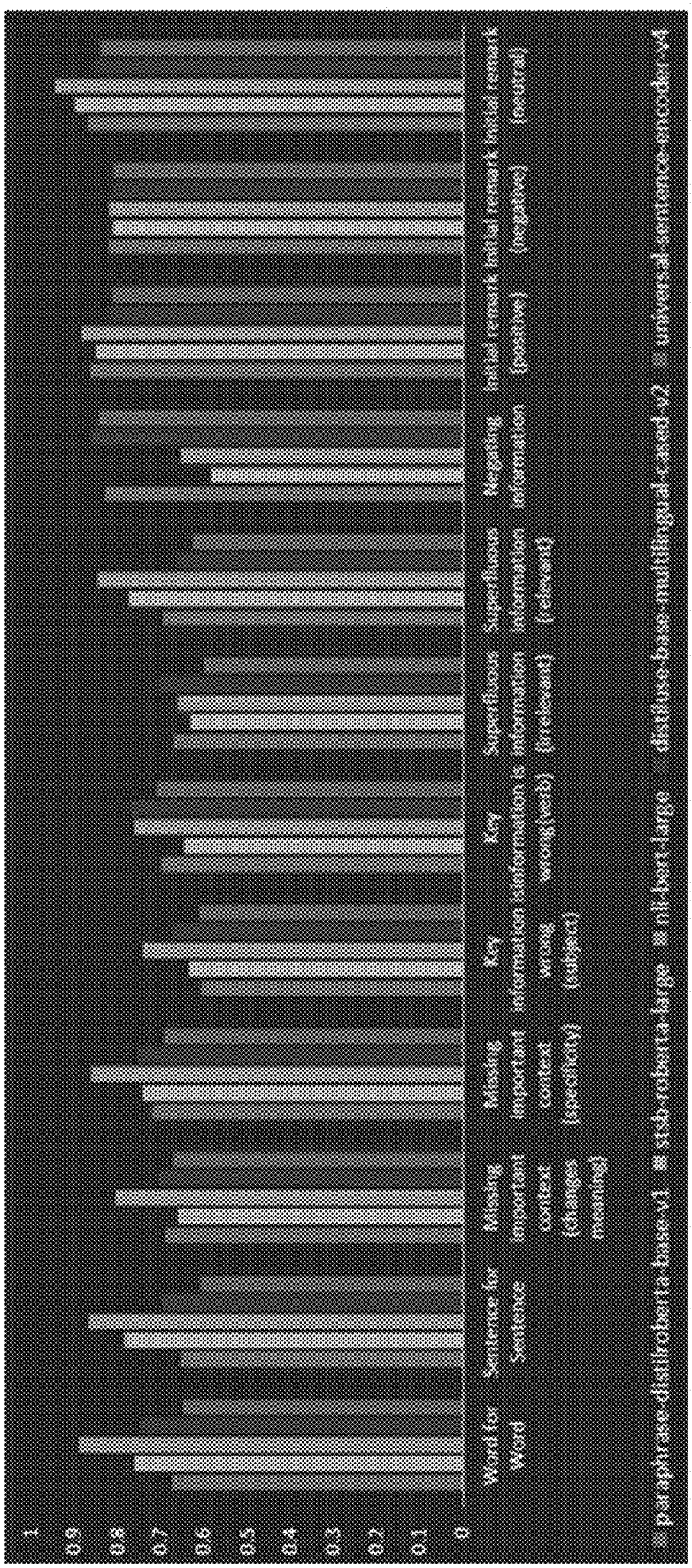
FIG. 5 shows an example of similarity/dissimilarity scores for each content category generated by various embedding and comparison algorithms, according to an embodiment.

In an embodiment, a method includes receiving, via a processor, a dataset that includes a plurality of input texts. Each input text from the plurality of input texts is associated with a content category from a plurality of content categories based on a comparison between that input text and an intended meaning that is common for each comparison. The method further includes running, via the processor for each model in a plurality of models, that model on each input text from the plurality of input texts to generate an average similarity/dissimilarity score for each content category from the plurality of content categories. The method further includes selecting, via the processor and based on the average similarity/dissimilarity score for each content category from the plurality of content categories for each model in the plurality of models, at least one model from the plurality of models to determine whether an input text is similar/dissimilar to the intended meaning. The method further includes generating, via the processor, at least one content category-specific natural language processing pipeline associated with at least one content category included in the plurality of content categories. The average similarity/dissimilarity score for the at least one content category is outside an acceptable range.

In an embodiment, a non-transitory processor-readable medium stores code representing instructions to be executed by one or more processors. The instructions comprise code to cause the one or more processors to receive a dataset that includes (1) a first set of input texts associated with a first content category based on a first comparison between each input text from the first set of input texts and an intended meaning that is common for each comparison, and (2) a second set of input texts associated with a second content category different than the first content category based on a second comparison between each input text from the second set of input texts and the intended meaning that is common for each comparison. The instructions further comprise code to cause the one or more processors to run a first model on the first set of input texts to generate a first similarity/dissimilarity score that is associated with the first content category. The instructions further comprise code to cause the one or more processors to run the first model on the second set of input texts to generate a second similarity/dissimilarity score that is associated with the second content category. The instructions further comprise code to cause the one or more processors to run a second model on the first set of input texts to generate a third similarity/dissimilarity score that is associated with the first content category. The instructions further comprise code to cause the one or more processors to run the second model on the second set of input texts to generate a fourth similarity/dissimilarity score that is associated with the second content category. The instructions further comprise code to cause the one or more processors to receive a request to determine similarity/dissimilarity of an input text to the intended meaning. The instructions further comprise code to cause the one or more processors to select the first model and not the second model for usage with the request based on the first similarity/dissimilarity score, the second similarity/dissimilarity score, the third similarity/dissimilarity score, and the fourth similarity/dissimilarity score. The instructions further comprise code to cause the one or more processors to cause similarity/dissimilarity of the input text to the intended meaning to be determined using the first model and not the second model.

In an embodiment, an apparatus includes a memory and a processor operatively coupled to the memory. The processor is configured to receive a dataset that includes a plurality of input texts. Each input text from the plurality of input texts is associated with a content category from a plurality of content categories based on a comparison between that input text and an intended meaning that is common for each comparison. The processor is further configured to, for each model in a plurality of models, run that model on each input text from the plurality of input texts to generate an average similarity/dissimilarity score for each content category from the plurality of content categories. The processor is further configured to select, based on the average similarity/dissimilarity score for each content category from the plurality of content categories for each model in the plurality of models, at least one model from the plurality of models to determine whether an input text is similar/dissimilar to the intended meaning. The processor is further configured to cause similarity/dissimilarity of the input text to the intended meaning to be determined using the at least one model and not remaining models from the plurality of models.

DETAILED DESCRIPTION

Known approaches for NLP pipelines use broad, general-based approaches without regard for specific applications. Models that determine similarity have typically relied on seminal data sets, such as Semantic Textual Similarity (STS) and Stanford Natural Language Inference (SNLI), to score similarity between texts. FIG. 1 illustrates an example from STS that has pre-classified similarity between sets of texts on a scale from 0 to 5. As can be seen, a score of 5 indicates that two sentences are completely equivalent, a score of 4 indicates that two sentences are mostly equivalent with some unimportant differences, a score of 3 indicates that two sentences are roughly equivalent with some important information being different, a score of 2 indicates two sentences are not equivalent but share some details, a score of 1 indicates two sentences are not equivalent but are on the same topics, and a score of 0 indicates two sentences are on different topics. In this example, similarity is measured on a scale from 0-5, meaning only six difference can exist between sentence pairs.

Known similarity scoring services have typically chosen an embedding and comparison algorithm combination (referred to as "model" or "models" hereinafter) that has been run on seminal data sets (e.g., STS, SNLI). This comparison of accuracy is based on definitions of similarity that are generalized and may have no applicability to certain domain-specific use cases. In other words, it has been predetermined what is considered similar versus dissimilar, as well as to what extent. For example, referring back to FIG. 1, it has been predetermined that "Two boys on a couch are playing video games" and "Two boys are playing a video game" have a similarity score of 4. However, in certain use cases, it is may be the case that these sentences should be considered more similar (e.g., score of 5), or less similar (e.g., score of 2). For instance, for a marketing team determining how to market a new couch designed for gamers, a determination of whether video games are being played on a couch or not may be the crucial distinction they would like to differentiate between, in which case a score lower than 4 may be desirable. On the other hand, for a video game company who only cares about whether or not video games are being played, and could care less about whether or not they are being played on a couch, a score higher than 4 may be desirable.

In light of the above-mentioned problems, the methods and apparatuses discussed herein allow for domain-specific approaches that can measure a model's sensitivity to domain-specific differences. That way, the best algorithm/combination of algorithms can be chosen for a specific use case (which may or may not be a different algorithm/combinations of algorithms best suited for a different use case). The resulting advantages include customizability for specific use case applications, and as a result, significant accuracy improvements in determining similarity between sets of text. As can be appreciated, such advantages can have many benefits across many different use cases.

In some embodiments, input text can be analyzed to determine if it includes an intended meaning. Input text can be received from a domain-specific application, such as a speech coaching lesson for managers or a legal document related to rental contracts. This input text is compared to an intended meaning, where the intended meaning acts as the target/goal that the input text is aiming to convey. Depending on how the input text compares to the intended meaning, that input text can be grouped into one or more content categories (e.g., word for word similarity, completely irrelevant, missing a key piece of information).

In some embodiments, input text can also be analyzed for style. Stylistic attributes don't change the core meaning of the input text, but can act as a hindrance when attempting to determine whether it has an intended meaning. In some aspects, style for intended meaning can be analogized to noise for a signal. Thus, input text can be grouped into one or more style categories. Thereafter, by knowing stylistic attributes related to the input text, it can be better analyzed.

The grouping of the input text to content categories and/or style categories can be done by a machine learning algorithm, a human, or a combination thereof. For example, a human can look at each input text, and group it to a specific group using their judgement (i.e., subjectively) for a particular application. As another example, a machine learning algorithm can have a first pass at categorizing each input text. Thereafter, the human can have a second pass to correct for any mistakes. In some embodiments, this human feedback can also be used to further train the machine learning model. In one embodiment, the machine learning algorithm can be a neural network trained to take an input text and categorize it into its appropriate content category, the content categories used in the training being the same as the content categories used while performing the first pass in this example.

As previously mentioned, pairings of input text and intended meaning can be analyzed and categorized into one or more groups based on two dimensions: their content and their style. In some instances, content refers to the meaning of input text (e.g., dealt with in a speech, literary work, etc. as distinct from its form or style), and a content category refers to whether the meaning of the input text includes the intended meaning and/or how the meaning of the input text compares to a different set of text (e.g., the intended meaning). The input text can be classified using into content categories that are "similar" or "dissimilar" to the intended meaning. Examples of similar groups (i.e., similar between the input text and the intended meaning) can include: sentence for sentence similarity; similar but contains some superfluous information; and word for word similarity. Examples of dissimilar categories (i.e., dissimilar between the input text and the intended meaning) can include: missing important context (changes meaning); missing important context (specificity); key information wrong (noun); and key information wrong (verb). In some instances, the content categories can be predefined (e.g., by a user). In some instances, the content categories relates to communication, such as language. For instance, a content category may sometimes be referred to as a communication content category, a language content category, a diction content category, a syntax content category, and/or the like (e.g., a diction/syntax content category).

In some instances, an intended meaning refers to a meaning (e.g., represented by text) that is to be compared to input text. In some instances, the intended meaning is a goal, truth value, target, reference, and/or the like. In some instances, the intended meaning is predetermined (e.g., by a user). In some instances, an intended meaning can refer to an acceptable response to a question or request that is to be compared against a different response to the question or request (e.g., to perform a search, to generate a grade or score, to answer a question, etc.). For example, the intended meaning can be an answer to a free response question that is correct, and other answers to the free response question can be compared to the intended meaning to score those other answers. As another example, the intended meaning can be a question to a customer inquiry for which an answer has been predetermined, and the question can be compared against other questions that a customer may have; if, for example, the question that the customer has matches the question for which the answer has been predetermined, that answer can be used to respond to the customer's question.

FIG. 2 illustrates an example of taking various domain-specific input texts and grouping them into different content categories. The column under "Base Sentence" refers to different categories of content (e.g., word for word category, sentence for sentence category), some of which characterize similarity between input text and intended meaning, and some of which characterize dissimilarity between input text and intended meaning. The text "Your team submitted the project late" is the intended meaning for this particular application, and the column under the "Your team submitted the project late" lists various input texts that have been grouped into its associated category based on the type of similarity/difference. For instance, the input text "Your team submitted the picnic later", compared to the intended meaning, had an incorrect noun, so it was grouped with the "key information is wrong (noun)" content category. A column for themes is also shown, which can be used to further categorize input texts within a content category; in other scenarios, this column is optional.

FIG. 3 illustrates another example of domain-specific input texts that have been grouped according to different content categories. The column under "Base Sentence" refers to different categories of content, which in this case is the same as the categories from FIG. 2 (though it does not need to be). The text "Your team submitted the project late" is the intended meaning, and the text beneath the intended meaning includes various inputs of text that were categorized into a content category based on the type of similarity/dissimilarity compared to the intended meaning. The table in FIG. 3 further includes a column for prevalence and priority, which can be used for determining prevalence and priority of certain content categories. Such information can be useful when choosing between models that have strong sensitivity for certain content categories, and weaker sensitivity for other content categories.

On the other hand, style refers more to a packaging of the input text, and does not change the core meaning. FIG. 4 illustrates an example of grouping input texts into different style categories based on style. The column under "Categories" refers to different style categories, and the column under "Examples" give an example of input text associated with a specific style (the bolded text in each example exhibiting the style category associated with that example). In general, style acts as noise when attempting to decipher an intended meaning from input text, so it can be desirable to de-noise such stylistic components in text. Examples of style groups can include: changing thought mid-sentence; run-on; remarks; implying; expanding; emphasizing; filler words; false starts; indirect (e.g., preheating); explaining; rewording; and bad ending. Of course, other style categories can be used as deemed appropriate for a specific application. In some implementations, indirect (e.g., preheating) can refer to a style where a responder qualifies their response excessively before getting to the point. For example, if the responder intends to say "you shouldn't be late", preheating may look like the responder instead saying "it is important to know that when operating in an environment with the constraints that we have, you must understand that you shouldn't be late."

Each input text can be run through different, known models to collect a similarity/dissimilarity score. Examples of models include "paraphrase-distilroberta-base-v1", "stsb-roberta-large", "nli-bert-large", "distiluse-base-multilingual-cased-v2", and "universal-sentence-encoder-v4", all of which are examples of models which embed input text into vector representations. The embedded text in vector representations can be compared to other embedded text in vector representation by using similarity algorithms like cosine similarity. Thereafter, using the scores associated with each input text, as well as knowledge of the content category each input text belongs to, each content category can be assigned an average score (i.e., average score of all input text scores within a content category). A sensitivity of each model can be analyzed/compared, where a higher sensitivity refers to a model's ability to have a higher similarity score for input text that contains the intended meaning (e.g., where there is word for word or sentence for sentence similarity), and its ability to have a lower similarity score for input text that is does not contain the intended meaning (e.g., where key information is wrong or there is negating information). In some embodiments, a sensitivity score can be generated using the collected similarity/dissimilarity scores to provide a convenient metric for comparing different models. Such a process can include using predefined knowledge on acceptable ranges for similarity/dissimilarity scores, prevalence, and/or priority to produce a grade/score indicating how sensitive a model is. For example, at a first content category (e.g., word for word similarity between input text and intended meaning), a score between 0.9-1 (with 1 meaning that the input text is most similar to the intended meaning and 0 meaning that the input text is least similar to the intended meaning) would be +1 point, a score between 0.8-0.89 would be +0.8 points, a score between 0.7-0.79 would be +0.6 points, a score between 0.4-0.59 would be 0 points, and a score less than 0.4 would be −1 point. At second category (e.g., negating information), a score between 0.6-1 could be −1 point, a score between 0.4-0.59 could be +0 points, and score between 0-0.39 could be +1 point. After tallying up a score for each content category, the model producing the highest score (i.e., the most sensitive) can be selected for future usage. In some implementations, the points from each content category can be weighted prior to tallying depending on how important that content category is. As can be appreciated, the number of points and/or range for different point amounts can vary for each content category. These can be pre-set and further tuned if desired.

By being able to analyze each model's sensitivity, the optimal model or combination of models can be chosen for an application in a particular use case. Being able to choose the optimal model(s) can thereby enable greater accuracy when determining whether a text has an intended meaning. Furthermore, by being able to analyze each model's strengths and weaknesses, where a particular model is strong and where it is weak can be known. Such information can be useful to know when choosing a model for an application where false negatives are preferred over false positives (or vice versa), according to one exemplary embodiment. In some embodiments, the model can be tweaked to address (improve with respect to) a weakness and/or further improve a strength.

FIG. 5 illustrates an example of results from running multiple models on input texts (from FIG. 2) to collect an average similarity/dissimilarity metric for each content category. For instance, the input text "Your group delivered the assignment late", which was grouped as having word for word similarity with the intended meaning of "Your team submitted the project late", was scored by the five models to produce a total of five scores, a score between 0-1 (1 being high similarity and 0 being low similarity) from each of the five models used. In this example, the models used are paraphrase-distilroberta-base-v1, stsb-roberta-large, nli-bert-large, distiluse-base-multilingual-cased-v2, and universal-sentence-encoder-v4. Each input text is compared to the intended meaning using each of these models to generate a similarity/dissimilarity metric. Thereafter, for content categories that had more than one input text, all the similarity/dissimilarity metrics for input texts within that specific content category are averaged to generate a similarity/dissimilarity metric for that specific content category. Such a process is repeated for each of the 12 content categories to generate a total of 60 content category similarity/dissimilarity metrics, as can be seen in FIG. 5.

Figure 6:
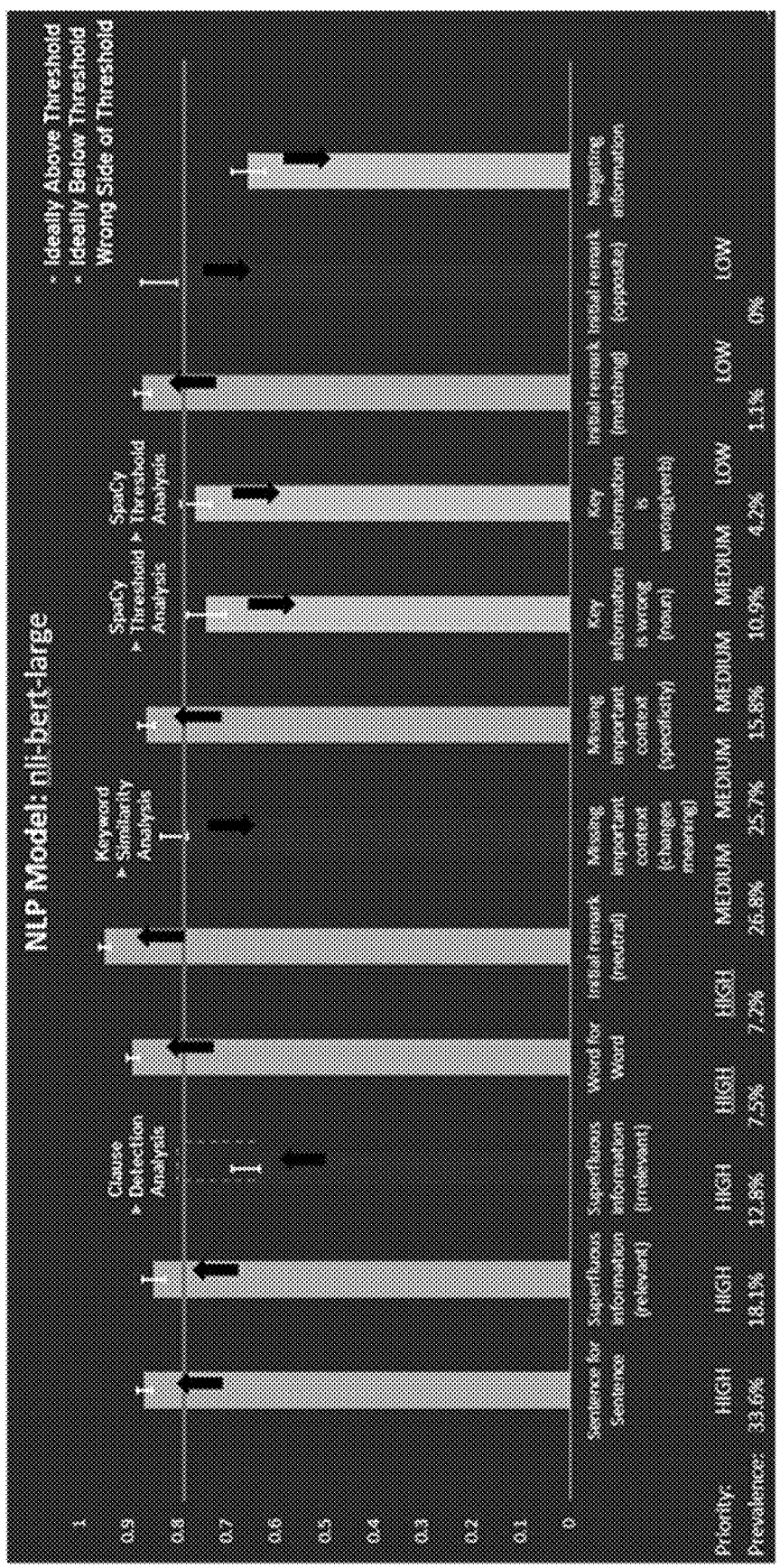
FIG. 6 shows an example of similarity/dissimilarity scores compared to a predetermined threshold for each content category generated by an embedding and comparison algorithm, according to an embodiment.

FIG. 6 illustrates an example of similarity/dissimilarity scores generated by the NLP model nli-bert-large (from FIG. 5) for each of the 12 content categories. As can be seen, for certain types of input text, the model is able to correctly identify similarity and dissimilarity. For instance, it is shown that nli-bert-large is able to (1) successfully determine similarity for input text that has sentence for sentence, superfluous information (relevant), word for word, initial remark (neutral), missing important context (specificity), and initial remark (matching) similarity compared to the intended meaning, and (2) successfully determine dissimilarity for input text that has key information wrong (noun), key information wrong (verb), and negating information compared to the intended meaning. It is also shown that nli-bert-large is poor at detecting similarity for input text categorized as superfluous information (irrelevant), and detecting dissimilarity for input text categorized as missing important context (changes meaning) or initial remark (opposite). Such information can be very valuable when deciding which model and/or combination of models to use when wanting to determine how similar/dissimilar two sets of text are. In some implementations, key noun information being wrong refers to input text including a noun that is not included in the intended meaning (and/or vice versa). In some implementations, key verb information being wrong refers to input text including a verb that is not included in the intended meaning (and/or vice versa). In some implementations, superfluous information can refer to text included in input text that is not included in intended meaning. The superfluous information may be relevant (e.g., related to the intended meaning) or irrelevant (e.g., not related to the intended meaning). Note, however, that the content categories can be determined by the user, and how various texts are categorized to their respective content categories can be decided by the user. Therefore, depending on circumstances (e.g., who the user is, what the user is trying to accomplish, etc.), what is considered, for example, key, superfluous, or irrelevant may vary.

In some embodiments, there is a single threshold across all associated content categories to determine whether there is similarity (passing the threshold) or dissimilarity (not passing the threshold). The optimum threshold value can be calculated through an algorithm taking into account category priority and prevalence. For example, if there is a dissimilar category with a high priority, a high prevalence, and a high similarity score, the threshold would be placed above that similarity score, even if it would be higher than similar categories that have low prevalence and low priority.

In some embodiments, in a case that a chosen model (or combination of models) does not perfectly suit a particular use case, knowledge regarding which content categories were identified as weak areas (e.g., on the wrong side of the threshold, very close to the threshold, has room for improvement) for that model, in addition to style information on the input texts in those content categories, can be used to define NLP pipelines that better capture whether an input text contains an intended meaning. Stylistic noise can be denoised in preprocessing such that the NLP pipelines account for content-meaning differences. These NLP pipelines can be pre-existing or unique for the specific use case. For instance, in verbal communication humans tend to not be as concise as in writing. In the specific case of finding intended meaning in verbal communication, a communication style may be defined as "long winded" for those that over-communicate an idea. Texts with this type of style may be categorized into the content category of, for example, "Similar—irrelevant information". The model selected may be weak in the category of "Similar—irrelevant information". By knowing these types of styles, pre-processing can occur that splits input texts into clauses or meaningful phrases, which are then fed into the selected model. The pre-processing "de-noises" this type of style and allows the model to work more effectively. Note, however, that considering for style is optional, and such pre-processing to de-noise for style can be skipped in some implementations. In other words, an NLP pipeline can be generated without pre-processing for the input text's style. For example, in other use-cases, even if an input text can be regarded as long winded, models can be run on the full input text (i.e., without pre-processing) because it can be desirable in some instances for similarity to be defined on the full input-text level.

Figure 7:
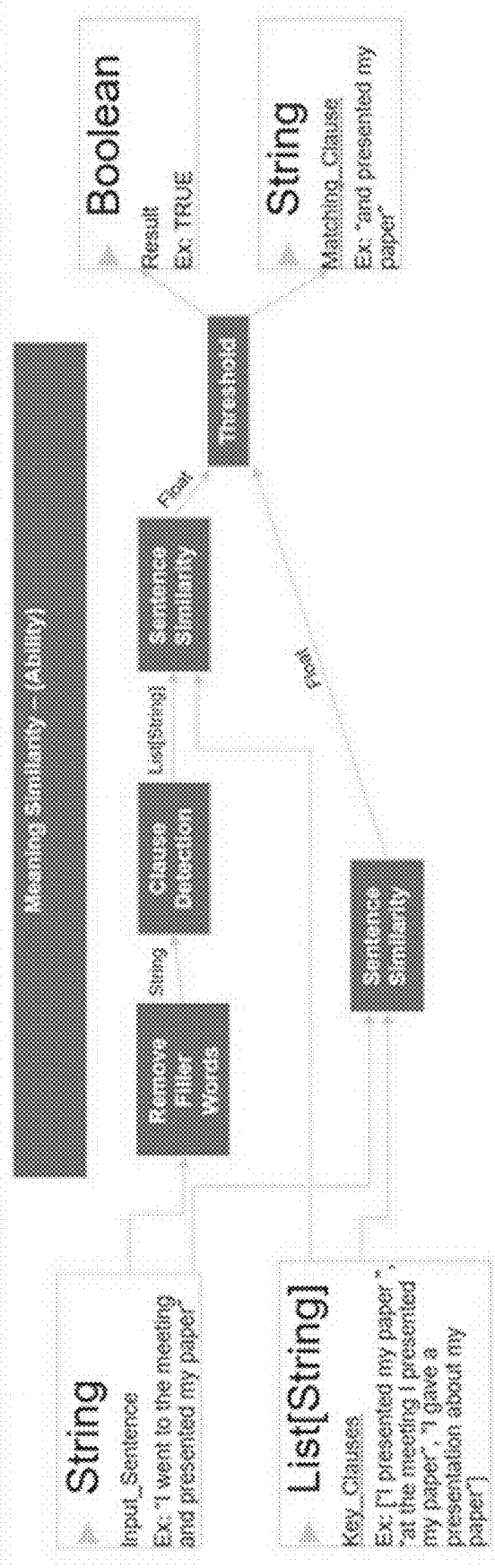
FIG. 7 shows an example of pre-processing input text to account for style and identify whether the input text contains an intended meaning, according to an embodiment.

FIG. 7 illustrates an example of using knowledge of style and low sensitivity categories to define NLP pipelines that can capture whether an input text contains the intended meaning. If the input text is "I went to the meeting and presented my paper", and the key points are "I presented my paper", "At the meeting I presented my paper", and "I gave a presentation about my paper", some models may be weak at detecting the similarity between the input text and the intended meanings. In such cases, stylistic attributes can be analyzed/edited, such as removing any filler words (at box labelled "Remove Filler Words"), splitting input texts into clauses or meaningful phrases (at box labelled "Clause Detection"), and comparing two sets of input text for similarity for key information by adding a constraint/requirement to include a predetermined keyword(s) and associated synonyms (e.g., input text must include "project" and synonyms of "project") (at box labelled "Sentence Similarity"). In some implementations, "Sentence Similarity" can include performing a subject-verb analysis that can extract the nominal subjects and verbs within an input text (e.g., a sentence) and compare them to the nominal subjects and verbs of the intended meaning (e.g., base sentence). In some implementations, "Sentence Similarity" can be used to (1) determine how similar words are to each other, and (2) determine an optimal threshold and number of similar subjects/verbs to determine whether the key information of the sentence can be considered correct. This can help account for cases when the input text is similar to the intended meaning, but does not have the same meaning because the subject or verb is different Thereafter, a similarity/dissimilarity score can be generated via sentence similarity analysis to determine whether the input text includes the key points.

The techniques discussed herein improve natural language processing ability, allowing text to be more accurately analyzed. As such, it can be appreciated that application can be found across a myriad of use cases. For the sake a brevity, a couple examples will be discussed now, but it can be appreciated many more use cases exist.

As one example, the techniques discussed herein can be used to power a scoring system of a communication-coaching application, where a user is asked to respond verbally to a simulated situation and include certain key points (i.e., intended meanings) when responding. The user's response is captured, converted to text, and analyzed to generate a score grading the user's response, which factors in whether the key points were included by the user. Determining whether the user's response included the key points can include using a model (or combination of models) that was determined to be best suited for this particular use case using the techniques discussed herein. Otherwise, a non-optimal model may be chosen, which may result in an undesirable number of false-positives, false-negatives, inaccurate scores, and/or etc.

As another example, the techniques discussed herein can be used when analyzing legal documents. The legal documents can be analyzed to determine if they include certain key points (i.e., intended meaning), such as certain contractual terms or liability protections. Being able to use the model(s) best suited for correctly identifying the presence of key points is highly desirable. By being able to take various input texts from previous legal documents, and group them based on different categories of content, the model best suited for this specific application can be identified. Furthermore, for categories of content where performance of the model is sub-par, stylistic attributes can be accounted for to enable the model to more easily determine similarity/dissimilarity for input text in those content categories.

Figure 8:
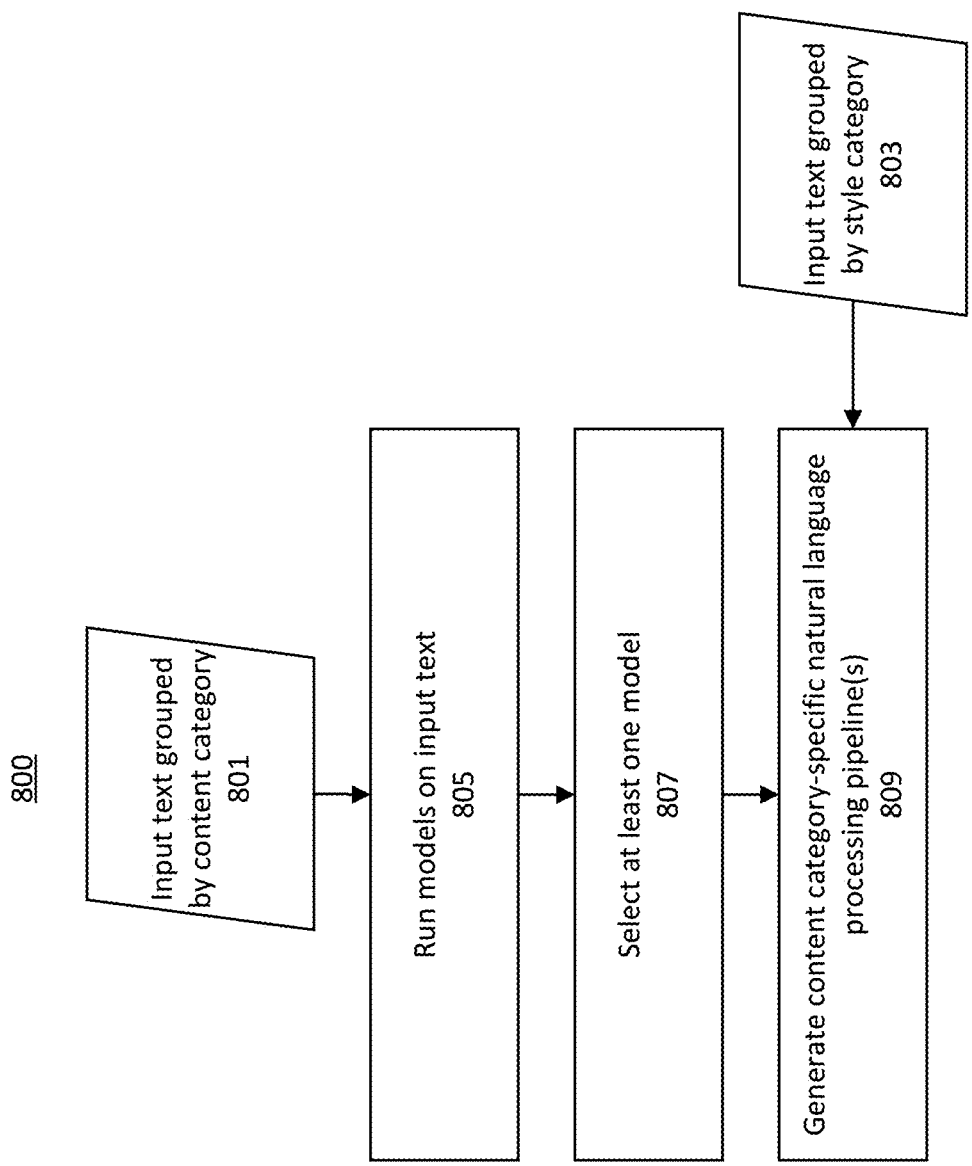
FIG. 8 shows a flowchart of a method for creating domain-specific intended-meaning natural language processing (NLP) pipelines, according to an embodiment.

FIG. 8 shows a flowchart outlining a method 800, according to an exemplary embodiment of the present disclosure. Input text grouped by content category 801 is obtained. The input text grouped by content category 801 includes a plurality of input text. Each from the plurality of input text is grouped into a content category based on a comparison between that input text and an intended meaning. Examples of input text grouped by content category 801 were previously discussed with respect to FIG. 2 and FIG. 3. Input text grouped by style category 803 is also obtained. The input text grouped by style category 803 includes at least a portion of the plurality of input text as the input text grouped by content category 801, and rather than being grouped into a content category, each input text is grouped into a style category. An example of input text grouped by style category 803 was previously discussed with respect to FIG. 4. Both the input text grouped by content category 801 and input text grouped by style category 803 can be grouped by a human, machine learning algorithm, or a combination thereof.

At 805, a plurality of models are run on (executed) each input text in the input text grouped by content category 801. Each model, for each input text, generates a score indicating a similarity between that input text and the intended meaning. Those scores are used to generate an average score for each content category included in the input text grouped by content category 801. For example, if a first input text in a first content category scored a 7.5/10 using a first model, and a second input text in the first content category scored an 8.5/10 using the first model, the first content category has a similarity score of 8 (i.e., average between 7.5 and 8.5) with the first model. An example of a result of performing 805 is discussed with respect to FIG. 5.

At 807, at least one model from the plurality of models is selected. One model, or a combination of models, can be selected. The model(s) can be selected, by a human or a machine learning algorithm, using the average similarity scores for each content category from 805. In some implementations, a machine learning algorithm can automatically select one or more models that are the most sensitive to similarities and differences between content categories and an intended meaning. This can be equivalent to selecting the model that has the most content categories on the correct side of an associated threshold. Further, a weighting concept can be used to prioritize between content categories in scenarios where detecting similarity/dissimilarity for certain content categories takes priority over others, for a given use case.

At 809, at least one content category-specific natural language processing pipeline is generated. For those content categories whose scores were too close to or on the wrong side of an associated threshold, the input text grouped by style category 803 can be used to denoise the associated input texts such that only the core meaning is analyzed. Certain stylistic elements (e.g., filler words, emphasis, repetition) can be removed and/or accounted for, thereby enabling the core meaning to be more easily deciphered. In other words, these natural language processing pipelines can mitigate and/or further improve scores for poor performing content categories to be more correct (e.g., increase score and/or decrease score) by preprocessing to account for stylistic differences. This content category-specific targeting is made possible by having the knowledge that certain models have certain weaknesses. In some implementations, 809 can be performed without using the input text grouped by style category 803.

Figure 9:
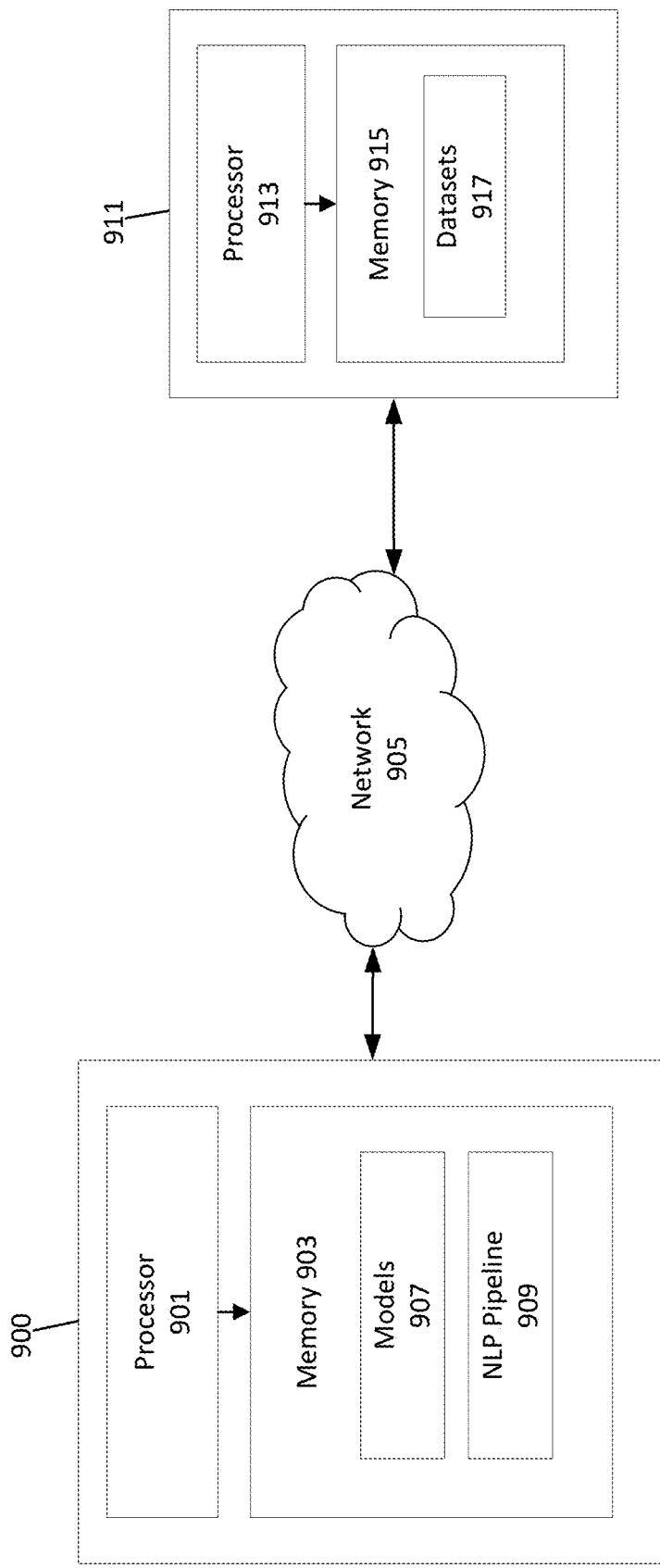
FIG. 9 shows a block diagram of a compute device for creating domain-specific intended-meaning NLP pipelines, according to an embodiment.

FIG. 9 shows a block diagram of compute devices 900, 911, according to an embodiment. The compute devices 900/911 can execute software to optimally analyze for intended meaning, such as software for running (executing) instructions associated with methods 800, 1000, 1100, 1200, or any of the other methods/implementations discussed herein. The compute device 900 includes a processor 901 operatively coupled to a memory 904, including models 907 and an NLP pipeline 909. The compute device 900 can be operatively coupled to the compute device 911, having a processor 913 operatively coupled to a memory 915 including datasets 917, via the network 905. The compute devices 900, 911 can be, for example, any type of computer, server, mobile phone, etc. that has a processor 901, 913 that executes instructions, such as software instructions stored in the memory 903, 915. The datasets 917 in the compute device 911 can include input text grouped by content (e.g., input text grouped by content category 801) and input text grouped by style (e.g., input text grouped by style category 803), where the different datasets can be generated by a human and/or the compute device 911. Although not shown, in some implementations, the processor 913 may be configured to receive input text, and use a machine learning algorithm stored in the memory 915, to group the input text according to style and/or content. The compute device 900 can retrieve the datasets 917 from the compute device 911 via the network 905. Thereafter, various models 907 can be run using the datasets 917 to generate similarity/dissimilarity scores. The models 907 can include different embedding and comparison algorithms. Thereafter, upon choosing one or more models from the models 907 with a desirable sensitivity, an NLP pipeline 909 can be generated that can use information related to style included in the datasets 917 to denoise input text for content categories with sub-par similarity/dissimilarity scores.

The compute devices 900, 911 can be operatively coupled to a network 905, which can be, for example, a wireless network(s) or a combination of a wireless network(s) and wired networks. In an embodiment, the connection between compute devices 900,911 and the network 905 can be a connection over a wireless network(s). A wireless network(s) of network 905 can include or enable, for example, a satellite connection(s) by which compute devices 900, 911 connects to a satellite (not shown) and for the satellite to connect to a remaining portion of network 905 or to other compute devices. Any portions of the steps and/or datasets discussed herein can be performed/stored with the compute device 900 and/or compute device 911. Of course, more or less compute devices connected to the network 905 can be used in other implementations for performing any of the steps discussed above.

In one or more alternative embodiments, the datasets 917 can be generated by the compute device 900 rather than the compute device 911, in which case the compute device 911 is not necessary. In such a case, the network 905 is not necessary either. Thus, the compute device 900 can perform the generating of the datasets 917, running of the models 907, and generating of the NLP pipeline 909 locally.

FIG. 10 shows a flowchart of a method 1000 to determine similarly/dissimilarly between an input text and an intended meaning, according to an embodiment. In some implementations, method 1000 is performed by a processor (e.g., processor 901 and/or 913).

At 1001, a dataset (e.g., datasets 917) that includes a plurality of input texts is received. Each input text from the plurality of input texts is associated with a content category from a plurality of content categories based on a comparison between that input text and an intended meaning that is common for each comparison.

At 1002, for each model in a plurality of models (e.g., models 907), that model is run on each input text from the plurality of input texts to generate an average similarity/dissimilarity score for each content category from the plurality of content categories. In some implementations, 1002 is performed automatically (e.g., without requiring human intervention) in response to completing 1001.

At 1003, at least one model from the plurality of models is selected, based on the average similarity/dissimilarity score for each content category from the plurality of content categories for each model in the plurality of models, to determine whether an input text is similar/dissimilar to the intended meaning. In some implementations, 1003 is performed automatically (e.g., without requiring human intervention) in response to completing 1002.

At 1004, at least one content category-specific natural language processing pipeline (e.g., NLP pipeline 909) associated with at least one content category included in the plurality of content categories is generated. The average similarity/dissimilarity score for the at least one content category is outside an acceptable range. In some implementations, 1004 is performed automatically (e.g., without requiring human intervention) in response to completing 1003.

In some implementations of method 1000, the dataset is a first dataset and the method further includes receiving a second dataset that includes the plurality of input texts. Each input text from the plurality of input texts is associated with a style category from a plurality of style categories. The plurality of input texts is associated with the plurality of style categories. The generating of the at least one content category-specific natural language processing pipeline is based on, at least partially, the second dataset. In some implementations, the plurality of style categories includes at least one of changing thought mid-sentence, run-on, remark, implying, expanding, emphasizing, filler words, false starts, indirect, explaining, rewording, or bad ending.

In some implementations of method 1000, steps 1001-1004 are performed by a processor (e.g., processor 901) included in a first compute device (e.g., compute device 900), and the dataset is received from a second compute device (e.g., compute device 911) that is remote from the first compute device.

In some implementations of method 1000, the plurality of content categories includes at least one of word-for word, sentence for sentence, missing important context that changes meaning, missing important specific context, key noun information is wrong, key verb information is wrong, irrelevant superfluous information, relevant superfluous information, negating information, remark matching sentiment, remark not matching sentiment, or neutral remark.

In some implementations of method 1000, for each input text from the plurality of input texts, the comparison between that input text and the intended meaning that is common for each comparison is performed by a machine learning model and without human intervention.

In some implementations of method 1000, for each input text from the plurality of input texts, the comparison between that input text and the intended meaning that is common for each comparison is performed by a machine learning model and checked by human feedback, the human feedback used to further train the machine learning model.

In some implementations of method 1000, the dataset is a first dataset, the plurality of input texts is a first plurality of input texts, the plurality of content categories is a first plurality of content categories, the intended meaning is a first intended meaning, the at least one model is at least one first model, and the input text is a first input text. Method 1000 further includes receiving a second dataset that includes a second plurality of input texts. Each input text from the second plurality of input texts is associated with a content category from a second plurality of content categories based on a comparison between that input text and a second intended meaning that is common for each comparison. Method 1000 further includes, for each model in the plurality of models, running that model on each input text from the second plurality of input texts to generate an average similarity/dissimilarity score for each content category from the second plurality of content categories. Method 1000 further includes selecting, based on the average similarity/dissimilarity score for each content category from the second plurality of content categories for each model in the plurality of models, at least one second model from the plurality of models to determine whether a second input text is similar/dissimilar to the second intended meaning.

FIG. 11 shows a flowchart of a method 1100 to select a model to determine a similarity/dissimilarity of an input text to an intended meaning, according to an embodiment. In some implementations, method 1100 can be performed by a processor (e.g., processor 901 and/or 913).

At 1101, a dataset (e.g., datasets 917) is received that includes (1) a first set of input texts associated with a first content category based on a first comparison between each input text from the first set of input texts and an intended meaning that is common for each comparison, and (2) a second set of input texts associated with a second content category different than the first content category based on a second comparison between each input text from the second set of input texts and the intended meaning that is common for each comparison.

At 1102, a first model (e.g., included in models 907) is run (executed) on the first set of input texts to generate a first similarity/dissimilarity score that is associated with the first content category. In some implementations, 1102 is performed automatically (e.g., without requiring human intervention) in response to completing 1101.

At 1103, the first model is run (executed) on the second set of input texts to generate a second similarity/dissimilarity score that is associated with the second content category. In some implementations, 1103 is performed automatically (e.g., without requiring human intervention) in response to completing 1101 and/or 1102.

At 1104, a second model (e.g., included in models 907) is run (executed) on the first set of input texts to generate a third similarity/dissimilarity score that is associated with the first content category. In some implementations, 1104 is performed automatically (e.g., without requiring human intervention) in response to completing 1101, 1102, and/or 1103. In some implementations, 1104 is performed parallel to 1102 and/or 1103.

At 1105, the second model is run (executed) on the second set of input texts to generate a fourth similarity/dissimilarity score that is associated with the second content category. In some implementations, 1103 is performed automatically (e.g., without requiring human intervention) in response to completing 1101, 1102, 1103, and/or 1104. In some implementations, 1105 is performed parallel to 1102 and/or 1103.

At 1106, a request to determine similarity/dissimilarity of an input text to the intended meaning is received. For example, a user may use a remote compute device to input a request represented by the input text, and the request to determine the similarity/dissimilarity of the input text may be received from the remote compute device.

At 1107, the first model is selected, and not the second model, for usage with the request based on the first similarity/dissimilarity score, the second similarity/dissimilarity score, the third similarity/dissimilarity score, and the fourth similarity/dissimilarity score. In some implementations, 1107 is performed automatically (e.g., without requiring human intervention) in response to completing 1106.

At 1108, similarity/dissimilarity of the input text to the intended meaning is caused to be determined using the first model and not the second model. In some implementations, 1108 is performed automatically (e.g., without requiring human intervention) in response to completing 1107.

Some implementations of method 1100 further include running a third model (e.g., included in models 907) on the first set of input texts to generate a fifth similarity/dissimilarity score that is associated with the first content category. The third model is also run on the second set of input texts to generate a sixth similarity/dissimilarity score that is associated with the second content category. Selecting the first model and not the second model for usage with the request at 1107 further includes selecting the first model and not the second model or the third model for usage with the request based on the first similarity/dissimilarity score, the second similarity/dissimilarity score, the third similarity/dissimilarity score, the fourth similarity/dissimilarity score, the fifth similarity/dissimilarity score, and the sixth similarity/dissimilarity score.

In some implementations of method 1100, the dataset further includes a third set of input texts associated with a third content category different than the first content category and the second content category based on a third comparison between each input text from the third set of input texts and the intended meaning that is common for each comparison. Some implementations of method 1100 further include running the first model on the third set of input texts to generate a fifth similarity/dissimilarity score that is associated with the third content category. Some implementations of method 1100 further include running the second model on the third set of input texts to generate a sixth similarity/dissimilarity score that is associated with the third content category. Selecting the first model and not the second model for usage with the request at 1107 is further based on the fifth similarity/dissimilarity score and the sixth similarity/dissimilarity score.

In some implementations of method 1100, selecting the first model and not the second model for usage with the request at 1107 includes comparing the first similarity/dissimilarity score and the third similarity/dissimilarity score to a first predetermined acceptable range, and comparing the second similarity/dissimilarity score and the fourth similarity/dissimilarity score to a second predetermined acceptable range different than the first predetermined acceptable range.

In some implementations of method 1100, selecting the first model and not the second model for usage with the request at 1107 includes comparing the first similarity/dissimilarity score, the second similarity/dissimilarity score, the third similarity/dissimilarity score, and the fourth similarity/dissimilarity score to a predetermined acceptable range.

In some implementations of method 1100, the first content category is associated with a first priority indicator. In some implementations of method 1100, the second content category is associated with a second priority indicator (e.g., the same as the first priority indicator, or different from the first priority indicator). In some implementations of method 1100, selecting the first model and not the second model for usage with the request at 1107 includes comparing the first similarity/dissimilarity score, the second similarity/dissimilarity score, the third similarity/dissimilarity score, and the fourth similarity/dissimilarity score to a set of predetermined acceptable range that are determined based on the first priority indicator and the second priority indicator.

In some implementations of method 1100, generating the first similarity/dissimilarity score at 1102 includes running the first model on each text from the first set of inputs texts to generate a similarity/dissimilarity score associated with that text and a first set of similarity/dissimilarity scores that are associated with the first set of input texts, the first similarity/dissimilarity score generated based on the first set of similarity/dissimilarity scores. In some implementations of method 1100, generating the second similarity/dissimilarity score at 1103 includes running the first model on each text from the second set of inputs texts to generate a similarity/dissimilarity score associated with that text and a second set of similarity/dissimilarity scores that are associated with the second set of input texts, the second similarity/dissimilarity score generated based on the second set of similarity/dissimilarity scores. In some implementations of method 1100, generating the third similarity/dissimilarity score at 1104 includes running the second model on each text from the first set of inputs texts to generate a similarity/dissimilarity score associated with that text and a third set of similarity/dissimilarity scores that are associated with the first set of input texts, the third similarity/dissimilarity score generated based on the third set of similarity/dissimilarity scores. In some implementations of method 1100, generating the fourth similarity/dissimilarity score at 1105 includes running the second model on each text from the second set of inputs texts to generate a similarity/dissimilarity score associated with that text and a fourth set of similarity/dissimilarity scores that are associated with the second set of input texts, the fourth similarity/dissimilarity score generated based on the fourth set of similarity/dissimilarity scores.

In some implementations of method 1100, at least one input text is included in the first set of input texts and the second set of inputs texts. In some implementations of method 1100, at least two input texts are included in the first set of input texts and the second set of inputs texts.

FIG. 12 shows a flowchart of a method 1200 to determine similarly/dissimilarly between an input text and an intended meaning, according to an embodiment. In some implementations, method 1200 is performed by a processor (e.g., processor 901 and/or 913).

At 1201, a dataset (e.g., datasets 917) is received that includes a plurality of input texts. Each input text from the plurality of input texts is associated with a content category from a plurality of content categories based on a comparison between that input text and an intended meaning that is common for each comparison.

At 1202, for each model in a plurality of models (e.g., models 907), that model is run (executed) on each input text from the plurality of input texts to generate an average similarity/dissimilarity score for each content category from the plurality of content categories. In some implementations, 1202 is performed automatically (e.g., without requiring human intervention) in response to completing 1201.

At 1203, based on the average similarity/dissimilarity score for each content category from the plurality of content categories for each model in the plurality of models, at least one model from the plurality of models is selected to determine whether an input text is similar/dissimilar to the intended meaning. In some implementations, 1203 is performed automatically (e.g., without requiring human intervention) in response to completing 1202.

At 1204, similarity/dissimilarity of the input text to the intended meaning is caused to be determined using the at least one model and not remaining models from the plurality of models. In some implementations, 1204 is performed automatically (e.g., without requiring human intervention) in response to completing 1203.

Some implementations of method 1200 further include generating at least one content category-specific natural language processing pipeline (e.g., NLP pipeline 909) associated with at least one content category included in the plurality of content categories, where the average similarity/dissimilarity score for the at least one content category is outside an acceptable range.

In some implementations of method 1200, the plurality of input texts are obtained from a verbal response provided by a user. In some implementations of method 1200, the plurality of input texts are obtained from a legal document (e.g., contract).

Although in the discussions above, an average similarity/dissimilarity score was calculated for each content category, in some embodiments, an average similarity/dissimilarity score can be calculated for each theme within each content category.

Although in the discussions above, each input text was grouped according to style, in some embodiments, only those input texts in categories with sub-par sensitivity for a chosen model(s) is grouped according to style.

Although in the discussions above, style was considered for input texts included in content categories with sub-par sensitivity for a chosen model(s), in some embodiments, style can be accounted for (i.e., denoised) for each input text prior to running the models.

Although in the discussions above, each input text was grouped in one content category and style category, in some embodiments, input text can be grouped to multiple content categories and/or style categories.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the Figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
receiving, via a processor, a dataset that includes a plurality of input texts, each input text from the plurality of input texts associated with a content category from a plurality of content categories based on a comparison between that input text and an intended meaning that is common for each comparison;
for each model in a plurality of models, running, via the processor, that model on each input text from the plurality of input texts to generate an average similarity/dissimilarity score for each content category from the plurality of content categories;
selecting, via the processor and based on the average similarity/dissimilarity score for each content category from the plurality of content categories for each model in the plurality of models, at least one model from the plurality of models to determine whether an input text is similar/dissimilar to the intended meaning; and
generating, via the processor, at least one content category-specific natural language processing pipeline associated with at least one content category included in the plurality of content categories, the average similarity/dissimilarity score for the at least one content category being outside an acceptable range.

2. The method of claim 1, wherein the dataset is a first dataset, the method further comprising:
receiving, via the processor, a second dataset that includes the plurality of input texts, each input text from the plurality of input texts associated with a style category from a plurality of style categories, the plurality of input texts associated with the plurality of style categories,
the generating of the at least one content category-specific natural language processing pipeline based on, at least partially, the second dataset.

3. The method of claim 2, wherein the plurality of style categories includes at least one of changing thought midsentence, run-on, remark, implying, expanding, emphasizing, filler words, false starts, indirect, explaining, rewording, or bad ending.

4. The method of claim 1, wherein the processor is included in a first compute device, and the dataset is received from a second compute device that is remote from the first compute device.

5. The method of claim 1, wherein the plurality of content categories includes at least one of word for word, sentence for sentence, missing important context that changes meaning, missing important specific context, key noun information is wrong, key verb information is wrong, irrelevant superfluous information, relevant superfluous information, negating information, remark matching sentiment, remark not matching sentiment, or neutral remark.

6. The method of claim 1, wherein, for each input text from the plurality of input texts, the comparison between that input text and the intended meaning that is common for each comparison is performed by a machine learning model and without human intervention.

7. The method of claim 1, wherein, for each input text from the plurality of input texts, the comparison between that input text and the intended meaning that is common for each comparison is performed by a machine learning model and checked by human feedback, the human feedback used to further train the machine learning model.

8. The method of claim 1, wherein the dataset is a first dataset, the plurality of input texts is a first plurality of input texts, the plurality of content categories is a first plurality of content categories, the intended meaning is a first intended meaning, the at least one model is at least one first model, the input text is a first input text, and the method further comprises:
receiving, via the processor, a second dataset that includes a second plurality of input texts, each input text from the second plurality of input texts associated with a content category from a second plurality of content categories based on a comparison between that input text and a second intended meaning that is common for each comparison;
for each model in the plurality of models, running, via the processor, that model on each input text from the second plurality of input texts to generate an average similarity/dissimilarity score for each content category from the second plurality of content categories; and
selecting, via the processor and based on the average similarity/dissimilarity score for each content category from the second plurality of content categories for each model in the plurality of models, at least one second model from the plurality of models to determine whether a second input text is similar/dissimilar to the second intended meaning.

9. A non-transitory processor-readable medium storing code representing instructions to be executed by one or more processors, the instructions comprising code to cause the one or more processors to:
receive a dataset that includes (1) a first set of input texts associated with a first content category based on a first comparison between each input text from the first set of input texts and an intended meaning that is common for each comparison, and (2) a second set of input texts associated with a second content category different than the first content category based on a second comparison between each input text from the second set of input texts and the intended meaning that is common for each comparison;
run a first model on the first set of input texts to generate a first similarity/dissimilarity score that is associated with the first content category;
run the first model on the second set of input texts to generate a second similarity/dissimilarity score that is associated with the second content category;
run a second model on the first set of input texts to generate a third similarity/dissimilarity score that is associated with the first content category;
run the second model on the second set of input texts to generate a fourth similarity/dissimilarity score that is associated with the second content category;
receive a request to determine similarity/dissimilarity of an input text to the intended meaning;
select the first model and not the second model for usage with the request based on the first similarity/dissimilarity score, the second similarity/dissimilarity score, the third similarity/dissimilarity score, and the fourth similarity/dissimilarity score; and
cause similarity/dissimilarity of the input text to the intended meaning to be determined using the first model and not the second model.

10. The non-transitory processor-readable medium of claim 9, wherein the code further comprises code to cause the one or more processors to:
run a third model on the first set of input texts to generate a fifth similarity/dissimilarity score that is associated with the first content category; and
run the third model on the second set of input texts to generate a sixth similarity/dissimilarity score that is associated with the second content category, selecting the first model and not the second model for usage with the request based on the first similarity/dissimilarity score, the second similarity/dissimilarity score, the third similarity/dissimilarity score, and the fourth similarity/dissimilarity score further including selecting the first model and not the second model or the third model for usage with the request based on the first similarity/dissimilarity score, the second similarity/dissimilarity score, the third similarity/dissimilarity score, the fourth similarity/dissimilarity score, the fifth similarity/dissimilarity score, and the sixth similarity/dissimilarity score.

11. The non-transitory processor-readable medium of claim 9, wherein the dataset further includes a third set of input texts associated with a third content category different than the first content category and the second content category based on a third comparison between each input text from the third set of input texts and the intended meaning that is common for each comparison, and the code further comprises code to cause the one or more processors to:
run the first model on the third set of input texts to generate a fifth similarity/dissimilarity score that is associated with the third content category; and
run the second model on the third set of input texts to generate a sixth similarity/dissimilarity score that is associated with the third content category, selecting the first model and not the second model for usage with the request further based on the fifth similarity/dissimilarity score and the sixth similarity/dissimilarity score.

12. The non-transitory processor-readable medium of claim 9, wherein selecting the first model and not the second model for usage with the request based on the first similarity/dissimilarity score, the second similarity/dissimilarity score, the third similarity/dissimilarity score, and the fourth similarity/dissimilarity score includes:
comparing the first similarity/dissimilarity score and the third similarity/dissimilarity score to a first predetermined acceptable range; and
comparing the second similarity/dissimilarity score and the fourth similarity/dissimilarity score to a second predetermined acceptable range different than the first predetermined acceptable range.

13. The non-transitory processor-readable medium of claim 9, wherein selecting the first model and not the second model for usage with the request based on the first similarity/dissimilarity score, the second similarity/dissimilarity score, the third similarity/dissimilarity score, and the fourth similarity/dissimilarity score includes comparing the first similarity/dissimilarity score, the second similarity/dissimilarity score, the third similarity/dissimilarity score, and the fourth similarity/dissimilarity score to a predetermined acceptable range.

14. The non-transitory processor-readable medium of claim 9, wherein:

the first content category is associated with a first priority indicator;

the second content category is associated with a second priority indicator; and selecting the first model and not the second model for usage with the request based on the first similarity/dissimilarity score, the second similarity/dissimilarity score, the third similarity/dissimilarity score, and the fourth similarity/dissimilarity score includes comparing the first similarity/dissimilarity score, the second similarity/dissimilarity score, the third similarity/dissimilarity score, and the fourth similarity/dissimilarity score to a set of predetermined acceptable range that are determined based on the first priority indicator and the second priority indicator.

15. The non-transitory processor-readable medium of claim 9, wherein:

generating the first similarity/dissimilarity score includes running the first model on each text from the first set of inputs texts to generate a similarity/dissimilarity score associated with that text and a first set of similarity/dissimilarity scores that are associated with the first set of input texts, the first similarity/dissimilarity score generated based on the first set of similarity/dissimilarity scores;

generating the second similarity/dissimilarity score includes running the first model on each text from the second set of inputs texts to generate a similarity/dissimilarity score associated with that text and a second set of similarity/dissimilarity scores that are associated with the second set of input texts, the second similarity/dissimilarity score generated based on the second set of similarity/dissimilarity scores;

generating the third similarity/dissimilarity score includes running the second model on each text from the first set of inputs texts to generate a similarity/dissimilarity score associated with that text and a third set of similarity/dissimilarity scores that are associated with the first set of input texts, the third similarity/dissimilarity score generated based on the third set of similarity/dissimilarity scores; and generating the fourth similarity/dissimilarity score includes running the second model on each text from the second set of inputs texts to generate a similarity/dissimilarity score associated with that text and a fourth set of similarity/dissimilarity scores that are associated with the second set of input texts, the fourth similarity/dissimilarity score generated based on the fourth set of similarity/dissimilarity scores.

16. The non-transitory processor-readable medium of claim 9, wherein at least one input text is included in the first set of input texts and the second set of inputs texts.

17. An apparatus comprising:

a memory; and a processor operatively coupled to the memory, the processor configured to:

receive a dataset that includes a plurality of input texts, each input text from the plurality of input texts associated with a content category from a plurality of content categories based on a comparison between that input text and an intended meaning that is common for each comparison;

for each model in a plurality of models, run that model on each input text from the plurality of input texts to generate an average similarity/dissimilarity score for each content category from the plurality of content categories;

select, based on the average similarity/dissimilarity score for each content category from the plurality of content categories for each model in the plurality of models, at least one model from the plurality of models to determine whether an input text is similar/dissimilar to the intended meaning; and cause similarity/dissimilarity of the input text to the intended meaning to be determined using the at least one model and not remaining models from the plurality of models.

18. The apparatus of claim 17, wherein the processor is further configured to:

generate at least one content category-specific natural language processing pipeline associated with at least one content category included in the plurality of content categories, the average similarity/dissimilarity score for the at least one content category being outside an acceptable range.

19. The apparatus of claim 17, wherein the plurality of input texts are obtained from a verbal response provided by a user.

20. The apparatus of claim 17, wherein the plurality of input texts are obtained from a legal document.

* * * * *